(12) United States Patent
Yang et al.

(10) Patent No.: US 9,632,610 B2
(45) Date of Patent: Apr. 25, 2017

(54) 3D TOUCH DISPLAY DEVICE, ITS MANUFACTURING METHOD AND DRIVING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/783,944

(22) PCT Filed: Jan. 6, 2015

(86) PCT No.: PCT/CN2015/070194
§ 371 (c)(1),
(2) Date: Oct. 12, 2015

(87) PCT Pub. No.: WO2016/045248
PCT Pub. Date: Mar. 31, 2016

(65) Prior Publication Data
US 2016/0216816 A1    Jul. 28, 2016

(30) Foreign Application Priority Data
Sep. 28, 2014  (CN) .......................... 2014 1 0508803

(51) Int. Cl.
*G06F 3/046*     (2006.01)
*G06F 3/041*     (2006.01)
(Continued)

(52) U.S. Cl.
CPC .......... *G06F 3/0412* (2013.01); *G02F 1/1333* (2013.01); *G02F 1/13338* (2013.01);
(Continued)

(58) Field of Classification Search
CPC .... G06F 3/03547; G06F 3/041; G06F 3/0412; G06F 3/0414; G06F 3/046; G06F 3/047;
(Continued)

(56) References Cited

U.S. PATENT DOCUMENTS

2009/0256819 A1* 10/2009 Jung ...................... G06F 3/041
                                                      345/174
2011/0007030 A1    1/2011 Mo et al.
(Continued)

FOREIGN PATENT DOCUMENTS

CN         101681221 A       3/2010
CN         102262478 A      11/2011
(Continued)

OTHER PUBLICATIONS

First Office Action regarding Chinese application No. 201410508803.8, dated Sep. 26, 2016. Translation provided by Dragon Intellectual Property Law Firm.
(Continued)

*Primary Examiner* — Lun-Yi Lao
*Assistant Examiner* — Jarurat Suteerawongsa
(74) *Attorney, Agent, or Firm* — Harness, Dickey & Pierce, P.L.C.

(57) ABSTRACT

The present disclosure provides a three-dimensional (3D) touch display device, its manufacturing method and driving method. Touch sensing electrodes and liquid crystal driving
(Continued)

electrodes are arranged alternately at an identical layer and insulated from each other in a 3D grating cell. The touch sensing electrodes and the liquid crystal driving electrodes are arranged between an insulating layer and a second substrate, and the liquid crystal driving electrode is configured to drive liquid crystals between the liquid crystal driving electrode and a first substrate to deflect horizontally at a display stage. An electrode layer arranged on a third or fourth substrate is configured to receive a touch driving signal at a touch stage so as to detect a touch operation, and receive a first common electrode signal at the display stage so as to display an image.

20 Claims, 4 Drawing Sheets

(51) Int. Cl.
G02F 1/1333 (2006.01)
G02F 1/1343 (2006.01)
(52) U.S. Cl.
CPC .... *G02F 1/13439* (2013.01); *G02F 1/134309* (2013.01); *G06F 3/041* (2013.01); *G06F 3/0416* (2013.01); *G06F 2203/04103* (2013.01)
(58) Field of Classification Search
CPC .... G06F 2203/041; G06F 3/044; G06F 3/045; G06F 2203/04107; G06F 2203/04111; G06F 2203/04112; G06F 2203/04113; G06F 3/0418; G06F 3/0416; G06F 2203/04103; G02F 1/1333; G02F 1/13338; G02F 1/134309; G02F 1/13439
See application file for complete search history.

(56) References Cited

U.S. PATENT DOCUMENTS

2012/0105434 A1    5/2012  Kuo et al.
2012/0274603 A1* 11/2012  Kim ..................... G06F 3/0412
                                                              345/174

FOREIGN PATENT DOCUMENTS

| CN | 202548493 U | 11/2012 |
| CN | 102830555 A | 12/2012 |
| CN | 202837756 U | 3/2013 |
| CN | 103091909 A | 5/2013 |
| CN | 103293726 A | 9/2013 |
| CN | 204086749 U | 1/2015 |

OTHER PUBLICATIONS

Written Opinion of the International Searching Authority and International Search Report filed Jan. 6, 2015 regarding international application No. PCT/CN2015/070194.

* cited by examiner

3D TOUCH DISPLAY DEVICE, ITS MANUFACTURING METHOD AND DRIVING METHOD

CROSS-REFERENCE TO RELATED APPLICATION

This application is the U.S. national phase of PCT Application No. PCT/CN2015/070194 filed on Jan. 6, 2015, which claims a priority of the Chinese Patent Application No. 201410508803.8 filed on Sep. 28, 2014, the disclosures of which are incorporated in their entirety by reference herein.

TECHNICAL FIELD

The present disclosure relates to the field of display technology, in particular to a three-dimensional (3D) touch display device, its manufacturing method and driving method.

BACKGROUND

Due to a naked-eye 3D technique, a viewer may be free of spectacles and observe a 3D image in a more convenient and comfortable manner, so the naked-eye 3D technique has become a new trend of the 3D display technique.

The naked-eye 3D imaging technique may include Active Barrier, Lenticular Lens and Directional Backlight 3D techniques. The Active Barrier 3D technique may be compatible with a process for manufacturing a liquid crystal display (LCD) and it is superior in terms of the mass-production and the production cost, so it is commonly used in a naked-eye 3D product.

The 3D technique may provide vivid visual perception, and a touch technique may facilitate the operation, so the combination thereof has attracted more and more attentions.

Currently, most of the products using the 3D technique and the touch technique include an Add-on touch panel and a 3D display device. The process for manufacturing this structure is complex and the production cost thereof is high. In addition, the entire display device is of a relatively large thickness, and the light transmission and the resultant display effect of the 3D display device and the entire LCD display module will be affected adversely.

SUMMARY

An object of the present disclosure is to provide a 3D touch display device, its manufacturing method and driving method, so as to simplify a process for manufacturing the 3D touch display device, reduce the production cost, improve the yield thereof, and detect a touch operation in an accurate manner while ensuring a 3D display effect.

In one aspect, the present disclosure provides in one embodiment a 3D touch display device, including a 3D grating cell and a liquid crystal module. The 3D grating cell includes a first polarizer, a first substrate, a liquid crystal layer, an insulating layer and a second substrate sequentially arranged in a direction close to the liquid crystal module. The liquid crystal module includes a third substrate and a fourth substrate, and the third substrate is located between the 3D grating cell and the fourth substrate.

The 3D grating cell further includes touch sensing electrodes and liquid crystal driving electrodes arranged alternately at an identical layer and insulated from each other. The touch sensing electrodes and the liquid crystal driving electrodes are arranged between the insulating layer and the second substrate, and the liquid crystal driving electrode is configured to drive liquid crystals between the liquid crystal driving electrode and the first substrate to deflect horizontally at a display stage.

The liquid crystal module further includes an electrode layer arranged on the third substrate or the fourth substrate. The electrode layer is configured to receive a touch driving signal at a touch stage so as to detect a touch operation, and receive a first common electrode signal at the display stage so as to display an image.

Alternatively, the touch sensing electrodes and the liquid crystal driving electrodes are all strip-like electrodes, and the electrode layer is of a strip-like pattern.

Alternatively, each touch sensing electrode is formed by binding a plurality of slit strip-like electrodes.

Alternatively, a pattern of the electrode layer includes a plurality of block electrodes electrically connected to each other.

Alternatively, the liquid crystal driving electrodes include a plurality of pixel electrodes and a plurality of common electrodes which are arranged alternately, parallel to each other, and interact with each other so as to drive the liquid crystals above the liquid crystal driving electrodes to deflect horizontally.

Alternatively, one end of each pixel electrode is connected to a pixel electrode signal transmission line of the 3D grating cell, and one end of each common electrode is connected to a common electrode signal transmission line of the 3D grating cell.

Alternatively, the pixel electrodes and the common electrodes are all strip-like electrodes.

Alternatively, one touch sensing electrode and one liquid crystal driving electrode form an electrode group which is arranged at a position corresponding to a pixel unit on the fourth substrate.

Alternatively, a width of the touch sensing electrode and a width of the liquid crystal driving electrode are each half a width of the pixel unit.

Alternatively, the second substrate further includes dummy electrodes arranged at an identical layer to, and insulated from, the touch sensing electrodes and the liquid crystal driving electrodes, and each dummy electrode is arranged between two adjacent touch sensing electrodes.

Alternatively, the touch sensing electrodes intersect electrodes on the electrode layer in different planes.

Alternatively, a second polarizer is arranged at a side of the third substrate close to the 3D grating cell.

Alternatively, the third substrate is a color filter substrate, and the fourth substrate is an array substrate.

In another aspect, the present disclosure provides in one embodiment a method for manufacturing the above-mentioned 3D touch display device, including steps of: providing a second substrate; forming patterns of touch sensing electrodes and liquid crystal driving electrodes arranged alternately at an identical layer and insulated from each other on the second substrate by a single patterning process, each liquid crystal driving electrode being configured to drive liquid crystals between the liquid crystal driving electrode and a first substrate to deflect horizontally at a display stage; and forming an insulating layer, a liquid crystal layer, the first substrate and a first polarizer sequentially on the touch sensing electrodes and the liquid crystal driving electrodes. The method further includes forming a pattern of an electrode layer on a third substrate or a fourth substrate, the electrode layer being configured to receive a touch driving signal at a touch stage so as to detect a touch operation, and receive a first common electrode signal at the display stage so as to display an image.

Alternatively, when forming the patterns of the touch sensing electrodes and the liquid crystal driving electrodes arranged alternately at an identical layer and insulated from each other on the second substrate by a single patterning process, the method further includes forming dummy electrodes arranged at an identical layer to, and insulated from, the touch sensing electrodes and the liquid crystal driving electrodes, each dummy electrode being arranged between two adjacent touch sensing electrodes.

In yet another aspect, the present disclosure provides in one embodiment a method for driving the above-mentioned 3D touch display device, including steps of: at a display stage within a time period, sending a liquid crystal driving signal including a pixel electrode signal and a common electrode signal to a liquid crystal driving electrode so as to drive liquid crystals above the liquid crystal driving electrode to deflect horizontally by a predetermined angle, and sending a first common electrode signal to an electrode layer; and at a touch stage within the time period, sending a driving touch signal to the electrode layer.

Alternatively, the time period is the time desired for displaying one frame.

Alternatively, at the display stage, the touch sensing electrode is at a potential of 0V identical to a common electrode of the 3D grating cell, and at the touch stage, a pixel electrode of the 3D grating cell is at a potential of 0V identical to the common electrode of the 3D grating cell.

According to the 3D touch display device, its manufacturing method and driving method in the embodiments of the present disclosure, the touch sensing electrodes and the liquid crystal driving electrodes are arranged alternately at an identical layer and insulated from each other in the 3D grating cell. The touch sensing electrodes and the liquid crystal driving electrodes are arranged between the insulating layer and the second substrate, and the liquid crystal driving electrode is configured to drive the liquid crystals between the liquid crystal driving electrode and the first substrate to deflect horizontally at the display stage. The electrode layer arranged on the third or fourth substrate is configured to receive the touch driving signal at the touch stage so as to detect a touch operation, and receive the first common electrode signal at the display stage so as to display an image. As a result, it is able to simplify a process for manufacturing the 3D touch display device, reduce the production cost, improve the yield thereof, and detect the touch operation in an accurate manner while ensuring a 3D display effect.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely parts of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
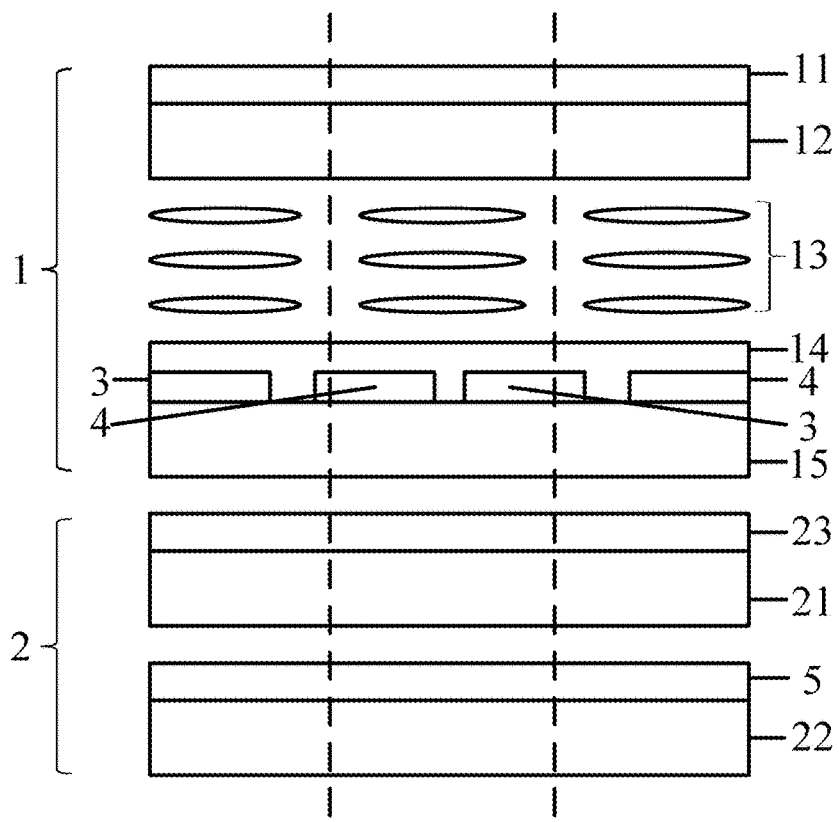
FIG. 1 is a schematic view showing a 3D touch display device according to one embodiment of the present disclosure.

Referring to FIG. 1, the present disclosure provides in one embodiment a 3D touch display device which may include a 3D grating cell 1 and a liquid crystal module 2, one on top of the other.

The 3D grating cell may include a first polarizer 11, a first substrate 12, a liquid crystal layer 13, an insulating layer 14 and a second substrate 15 arranged sequentially in a direction close to the liquid crystal module. The liquid crystal module 2 may include a third substrate 21 and a fourth substrate 22, and the third substrate 21 is arranged between the 3D grating cell 1 and the fourth substrate 22.

The 3D grating cell further includes touch sensing electrodes 3 and liquid crystal driving electrodes 4 arranged alternately at an identical layer and insulated from each other. The touch sensing electrodes 3 and the liquid crystal driving electrodes 4 are arranged between the insulating layer 14 and the second substrate 15, and the liquid crystal driving electrode 4 is configured to drive liquid crystals between the liquid crystal driving electrode 4 and the first substrate 12 to deflect horizontally at a display stage.

The liquid crystal module 2 may further include an electrode layer 5 arranged on the third substrate 21 or the fourth substrate 22. The electrode layer 5 is configured to receive a touch driving signal at a touch stage so as to detect a touch operation, and receive a first common electrode signal at the display stage so as to display an image.

In FIG. 1, the electrode layer 5 is arranged at a side of the fourth substrate 22 close to the third substrate 21. Of course, in the actual application, the electrode layer 5 may also be arranged at a side of the third substrate 21.

As shown in FIG. 1, the 3D touch display device in the embodiments of the present disclosure consists of the 3D grating cell 1 and the liquid crystal module (LCM) 2. The touch sensing electrodes 3 and the liquid crystal driving electrodes 4 are arranged alternately at an identical layer on the second substrate 15, i.e., a lower substrate, and insulated from each other. The touch sensing electrode 3 is configured to, at the touch stage within a time period (e.g., one frame), interact with the electrode layer 5 on the third substrate 21 or the fourth substrate 22, so as to detect the touch operation. The liquid crystal driving electrode 4 is configured to, at the display stage within the time period, drive the nematic liquid crystals above a pixel unit to which the liquid crystal driving electrode 4 belongs (i.e., above the liquid crystal driving electrode 4) to deflect in a horizontal direction. In other words, the 3D touch display device in the embodiments of the present disclosure may adopt an In-Plane Switching (IPS) technique, so as to drive the liquid crystal molecules.

According to the 3D touch display device in the embodiments of the present disclosure, the touch sensing electrodes 3 for detecting the touch and the liquid crystal driving electrodes 4 for driving the liquid crystals to deflect horizontally are arranged on the second substrate 15, i.e., the lower substrate, of the 3D grating cell, and no electrodes are arranged on the first substrate 12, i.e., an upper substrate, of the 3D grating cell, so it is able to arrange the first substrate 12 and the second substrate 15 directly opposite to each other to form a cell, thereby to remarkably simplify the process for manufacturing the 3D touch display device, reduce the production cost and improve the yield thereof.

In addition, the 3D touch display device in the embodiments of the present disclosure is driven in a time-division manner, i.e., the 3D display driving and the touch detection are performed at different stages within the time period, so as to prevent the mutual interference between the touch detection and the 3D displaying, thereby to detect the touch operation in an accurate manner while ensuring the naked-eye 3D display effect and to achieve a perfect combination of the 3D displaying with the touch detection.

Figure 2:
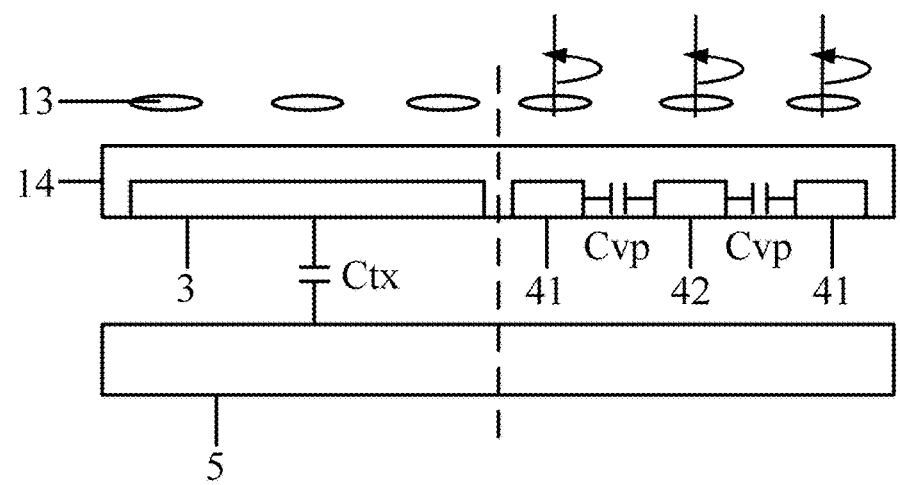
FIG. 2 is another schematic view showing the 3D touch display device according to one embodiment of the present disclosure.

In an alternative embodiment, as shown in FIG. 2, the liquid crystal driving electrode 4 may include pixel electrodes 41 and common electrode 42. In this way, when a pixel electrode signal is inputted into the pixel electrode 41 and a common electrode signal is inputted into the common electrode 42 through corresponding signal transmission lines, respectively, the pixel electrode 41 may interact with the common electrode 42 so as to generate a voltage (Cvp) for deflecting the liquid crystals, thereby to drive the nematic liquid crystals above the liquid crystal driving electrode 4 to deflect in the horizontal direction and enable a display region where the liquid crystal driving electrode 4 is located to be a bright field.

Meanwhile, as shown in FIG. 2, no voltage is applied to drive the liquid crystals above the touch sensing electrode 3 to deflect, so the display region where the touch sensing electrode 3 is located is a dark field.

In the horizontal direction, there may exist a plurality of electrode groups (each including one touch sensing electrode 3 and one 3D driving electrode 4) in the 3D grating cell as shown in FIG. 2. In this way, an active barrier effect, that the bright and dark fields are generated alternately, occurs in the 3D touch display device, thereby to achieve the naked-eye 3D display.

In the embodiments of the present disclosure, the electrode group in FIG. 2 may be arranged at a position corresponding to a pixel unit on the fourth substrate 22 (e.g., an array substrate), i.e., arranged above the pixel unit, and cover the pixel unit. In addition, in each electrode group, a width of the touch sensing electrode 3 and a width of the liquid crystal driving electrode 4 are each half a width of the pixel unit, i.e., each of the touch sensing electrode 3 and the liquid crystal driving electrode 4 shields a corresponding half of the pixel unit, so that the active barrier effect occurs at the position where the pixel unit is located.

Figure 3:
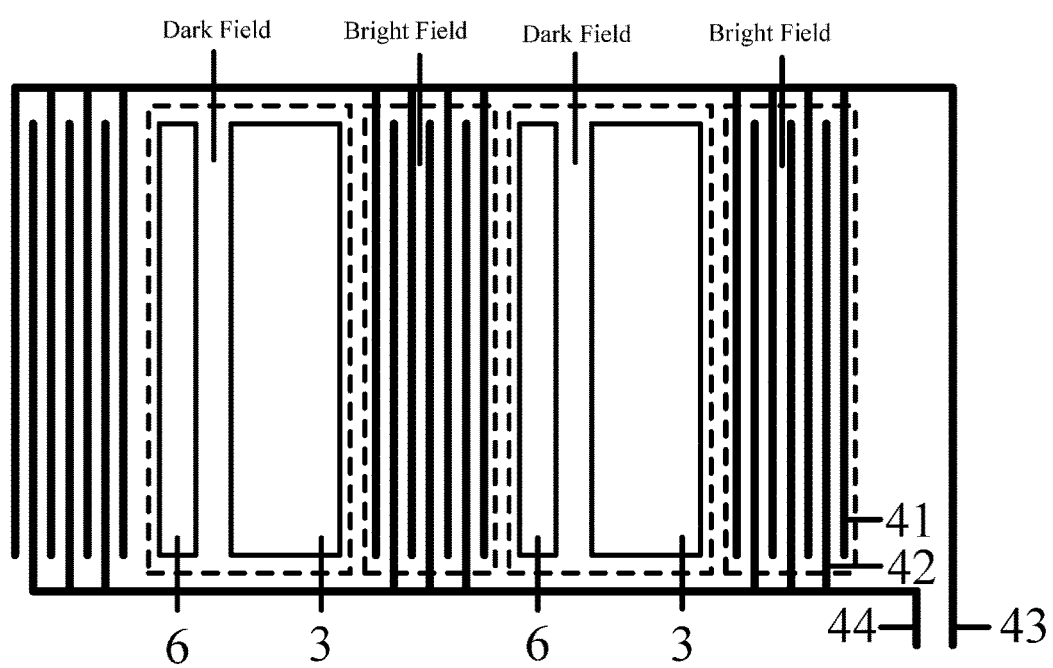
FIG. 3 is yet another schematic view showing the 3D touch display device according to one embodiment of the present disclosure.

In the embodiments of the present disclosure, as shown in FIG. 3, the pixel electrodes 41 and the common electrodes 42 may be arranged alternately, and connected to each other, respectively, at a periphery of the display region. In other words, one end of each pixel electrode 41 is connected to a pixel electrode signal transmission line 43, and one end of each common electrode 42 is connected to a common electrode signal transmission line 44. The pixel electrode signal transmission line 43 and the common electrode signal transmission line 44 may be connected to a pad region.

As also shown in FIG. 3, the pixel electrodes 41 and the common electrodes 42 may be strip-like electrodes.

As further shown in FIG. 3, the touch sensing electrodes 3 may also be strip-like electrodes, and each touch sensing electrode 3 may be formed by binding a plurality of slit strip-like electrodes.

Figure 4:
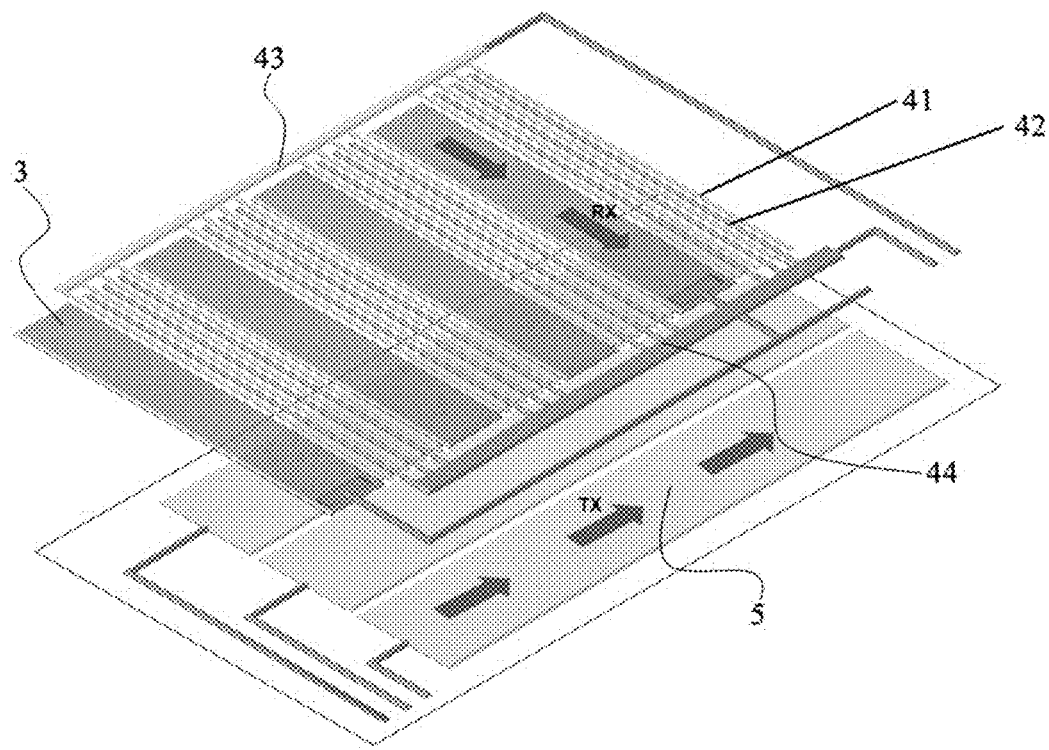
FIG. 4 is still yet another schematic view showing the 3D touch display device according to one embodiment of the present disclosure.

Referring to FIG. 4, the electrode layer 5 may be of a strip-like pattern. Of course, in another embodiment, the electrode layer 5 may include a plurality of block electrodes electrically connected to each other.

As shown in FIG. 4, the touch sensing electrodes 3 and the pattern of the electrode layer 5 may intersect, e.g., perpendicularly intersect, each other in different planes.

At the touch stage, the electrode layer 5 receives a touch driving signal TX (i.e., the electrode layer 5 serves as a touch driving electrode at the touch stage), and at this time, a coupling capacitance Ctx is formed between the touch driving electrode and the touch sensing electrode 3 that receives a touch sensing signal RX. When a touch operation has been made, an electric field between the touch sensing electrode 3 and the touch driving electrode is changed by an object (e.g., a stylus or a finger), so the touch driving signal and the touch sensing signal are changed correspondingly. Based on this change, it is able to determine an X-axis coordinate and a Y-axis coordinate of a touch point, thereby to determine position information about the touch point.

In an alternative embodiment, as shown in FIG. 3, dummy electrodes 6, at an appropriate amount, may be arranged between two adjacent touch sensing electrodes 3, so as to prevent the occurrence of a parasitic capacitance between the touch sensing electrode 3 and the liquid crystal driving electrode 4, thereby to detect the touch operation in a more accurate manner. In other words, the second substrate 15 further includes the dummy electrodes 6 arranged at an identical layer to, and insulated from, the touch sensing electrodes 3 and the liquid crystal driving electrodes 4, and each dummy electrode 6 is arranged between two adjacent touch sensing electrodes 3.

In the embodiments of the present disclosure, as shown in FIG. 1, a second polarizer 23 may be arranged at a side of the third substrate 21 close to the 3D grating cell 1.

In the embodiments of the present disclosure, the third substrate 21 may be a color filter substrate, and the fourth substrate 22 may be an array substrate.

The present disclosure further provides in one embodiment a method for manufacturing the above-mentioned 3D touch display device, which may include steps of: providing the second substrate 15; forming patterns of the touch sensing electrodes 3 and liquid crystal driving electrodes 4 arranged alternately at an identical layer and insulated from each other on the second substrate 15 by a single patterning process, each liquid crystal driving electrode 4 being configured to drive the liquid crystals between the liquid crystal driving electrode 4 and the first substrate 12 to deflect horizontally at the display stage; and forming the insulating layer 14, the liquid crystal layer 13, the first substrate 12 and the first polarizer 11 sequentially on the touch sensing electrodes 3 and the liquid crystal driving electrodes 4.

The method further includes forming a pattern of the electrode layer 5 on the third substrate 21 or a fourth substrate 22, the electrode layer 5 being configured to receive a touch driving signal at the touch stage so as to detect a touch operation, and receive a first common electrode signal at the display stage so as to display an image.

In an alternative embodiment, when forming the patterns of the touch sensing electrodes 3 and the liquid crystal driving electrodes 4 arranged alternately at an identical layer and insulated from each other on the second substrate 15 by a single patterning process, the method further includes forming the dummy electrodes 6 arranged at an identical layer to, and insulated from, the touch sensing electrodes 3 and the liquid crystal driving electrodes 4, each dummy electrode 6 being arranged between two adjacent touch sensing electrodes 3.

The processes for manufacturing the patterns and layers are not particularly defined herein.

The present disclosure further provides in one embodiment a method for driving the above-mentioned 3D touch display device, which may include steps of: at the display stage within a time period, sending a liquid crystal driving signal including a pixel electrode signal and a common electrode signal to the liquid crystal driving electrode 4 so as to drive the liquid crystals above the liquid crystal driving electrode 4 to deflect horizontally by a predetermined angle, and sending a first common electrode signal to the electrode layer 5; and at the touch stage within the time period, sending a driving touch signal to the electrode layer 5.

In order to meet the requirements on the 3D display effect and the touch detection, the 3D touch display device in the embodiments of the present disclosure is driven in time-division manner, i.e., the 3D display driving and the touch detection performed at different stages within the time period, so as to prevent the mutual interference between the touch detection and the 3D display driving, thereby to detect the touch operation in an accurate manner while ensuring the 3D display effect, and achieve a perfect combination of the 3D display driving with the touch detection.

The time period involved in the embodiments of the present disclosure may be the time desired for displaying one frame, e.g., 16.67 ms. A part of this time, e.g., 12.67 ms, may be taken as the 3D display stage at which no touch detection is performed, and the other part of this time, e.g., 4 ms, may be taken as the touch stage at which no 3D display driving is performed.

Figure 5:
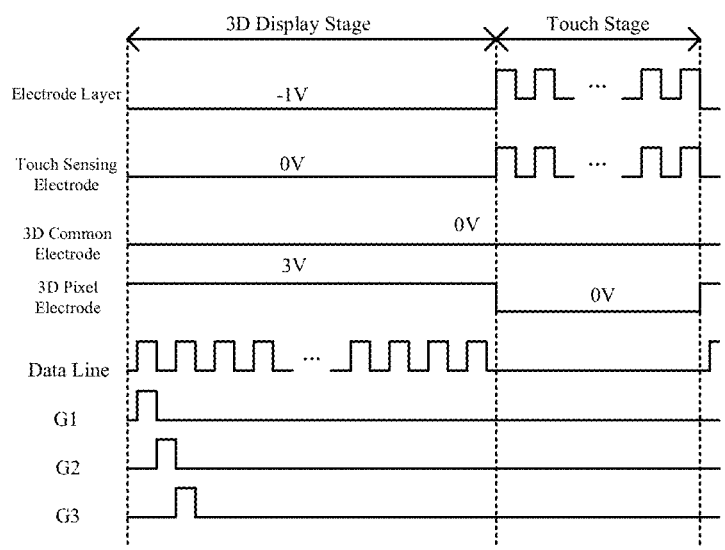
FIG. 5 is a sequence diagram of driving signals for the 3D touch display device according to one embodiment of the present disclosure.

The implementation of the method for driving the 3D touch display device will be described hereinafter in conjunction with the signal sequence shown in FIG. 5.

At the display stage, all gate lines (Gn) in the 3D touch display device are turned on progressively, and a corresponding grayscale signal is normally inputted into the data lines (Data). A signal of 3V is inputted into the pixel electrode 41 of the 3D grating cell and a signal of 0V is inputted into the common electrode 42 of the 3D grating cell via the corresponding signal transmission lines. To be specific, the common electrode 42 may be grounded, so as to enable a voltage difference between the pixel electrode 41 and the common electrode 42 to be equal to 3V. This voltage difference is sufficient to enable the nematic liquid crystals above the liquid crystal driving electrode 4 to deflect horizontally, thereby to enable the display region where the liquid crystal driving electrode 4 is located to be a bright field.

At the display stage, the touch sensing electrode 3 is connected to a zero-potential signal input end, e.g., the ground, so that the potential at the touch sensing electrode 3 is zero. At this time, no driving voltage is applied to the liquid crystals above the touch sensing electrode 3 and the liquid crystals cannot deflect, so the display region where the touch sensing electrode 3 is located is a dark field.

In this way, an active barrier effect occurs in the 3D touch display device so as to generate the bright and dark fields alternately, thereby to achieve the naked-eye 3D display.

The potential at the touch sensing electrode 3 may be zero at the display stage, so no touch detection is performed at the display stage, so as to prevent the 3D display effect from being adversely affected.

At the display stage, the electrode layer 5 arranged on the third substrate 21 or the fourth substrate 22 serves as the common electrode in the liquid crystal module, so a common electrode signal, e.g., a signal of −1V, may be inputted to the electrode layer 5 as a reference voltage for the liquid crystal display.

At the touch stage, the electrode layer 5 serves as a touch driving electrode, and a touch driving signal may be inputted to the electrode layer 5. At this time, a touch sensing signal with a certain potential may be inputted to the touch sensing electrode 3, so as to detect a touch operation.

At the touch stage, a signal of 0V is inputted to the pixel electrode 41, and the potential at the common electrode 42 still remains as 0V, so the voltage difference between the pixel electrode 41 and the common electrode 42 is 0. In addition, since the time for the touch stage is short, e.g., merely 4 ms, the liquid crystals cannot deflect at the touch stage, and the display effect may be ensured at the touch stage. Meanwhile, the potentials at the pixel electrode 41 and the common electrode 42 are both 0V, so it is able to reduce the interference of the pixel electrode 41 and the common electrode 42 on the touch sensing electrode 3, thereby to improve the touch detection.

According to the 3D touch display device, its manufacturing method and driving method in the embodiments of the present disclosure, the touch sensing electrodes and the liquid crystal driving electrodes are arranged alternately at an identical layer and insulated from each other in the 3D grating cell. The touch sensing electrodes and the liquid crystal driving electrodes are arranged between the insulating layer and the second substrate, and the liquid crystal driving electrode is configured to drive the liquid crystals between the liquid crystal driving electrode and the first substrate to deflect horizontally at the display stage. The electrode layer arranged on the third or fourth substrate is configured to receive the touch driving signal at the touch stage so as to detect a touch operation, and receive the first common electrode signal at the display stage so as to display an image. As a result, it is able to simplify a process for manufacturing the 3D touch display device, reduce the production cost, improve the yield thereof, and detect the touch operation in an accurate manner while ensuring the 3D display effect.

The above are merely the preferred embodiments of the present disclosure. It should be appreciated that, a person skilled in the art may make further modifications and improvements without departing from the principle of the present disclosure, and these modifications and improvements shall also fall within the scope of the disclosure.

What is claimed is:

1. A three-dimensional (3D) touch display device, comprising a 3D grating cell and a liquid crystal module, the 3D grating cell comprising a first polarizer, a first substrate, a liquid crystal layer, an insulating layer and a second substrate sequentially arranged in a direction close to the liquid crystal module, the liquid crystal module comprising a third substrate and a fourth substrate, and the third substrate being located between the 3D grating cell and the fourth substrate, wherein the 3D grating cell further comprises touch sensing electrodes and liquid crystal driving electrodes arranged alternately at an identical layer and insulated from each other, wherein the touch sensing electrodes and the liquid crystal driving electrodes are arranged between the insulating layer and the second substrate, and the liquid crystal driving electrode is configured to drive liquid crystals between the liquid crystal driving electrode and the first substrate to deflect horizontally at a display stage; and the liquid crystal module further comprises an electrode layer arranged on the third substrate or the fourth substrate; wherein the electrode layer is configured to receive a touch driving signal at a touch stage so as to detect a touch operation, and receive a first common electrode signal at the display stage so as to display an image.

2. The 3D touch display device according to claim 1, wherein the touch sensing electrodes and the liquid crystal driving electrodes are all strip-like electrodes, and the electrode layer is of a strip-like pattern.

3. The 3D touch display device according to claim 1, wherein each touch sensing electrode is formed by binding a plurality of slit strip-like electrodes.

4. The 3D touch display device according to claim 1, wherein a pattern of the electrode layer comprises a plurality of block electrodes electrically connected to each other.

5. The 3D touch display device according to claim 1, wherein the liquid crystal driving electrodes comprise a plurality of pixel electrodes and a plurality of common electrodes which are arranged alternately, parallel to each other, and interact with each other so as to drive the liquid crystals above the liquid crystal driving electrodes to deflect horizontally.

6. The 3D touch display device according to claim 5, wherein one end of each pixel electrode is connected to a pixel electrode signal transmission line of the 3D grating cell, and one end of each common electrode is connected to a common electrode signal transmission line of the 3D grating cell.

7. The 3D touch display device according to claim 6, wherein the pixel electrodes and the common electrodes are all strip-like electrodes.

8. The 3D touch display device according to claim 1, wherein one touch sensing electrode and one liquid crystal driving electrode form an electrode group which is arranged at a position corresponding to a pixel unit on the fourth substrate.

9. The 3D touch display device according to claim 8, wherein a width of the touch sensing electrode and a width of the liquid crystal driving electrode are each half a width of the pixel unit.

10. The 3D touch display device according to claim 1, wherein the second substrate further comprises dummy electrodes arranged at an identical layer to, and insulated from, the touch sensing electrodes and the liquid crystal driving electrodes, and each dummy electrode is arranged between two adjacent touch sensing electrodes.

11. The 3D touch display device according to claim 1, wherein the touch sensing electrodes intersect electrodes on the electrode layer in different planes.

12. The 3D touch display device according to claim 1, wherein a second polarizer is arranged at a side of the third substrate close to the 3D grating cell.

13. The 3D touch display device according to claim 1, wherein the third substrate is a color filter substrate, and the fourth substrate is an array substrate.

14. A method for manufacturing the three-dimensional (3D) touch display device according to claim 1, comprising steps of:

providing a second substrate;

forming patterns of touch sensing electrodes and liquid crystal driving electrodes arranged alternately at an identical layer and insulated from each other on the second substrate by a single patterning process, each liquid crystal driving electrode being configured to drive liquid crystals between the liquid crystal driving electrode and a first substrate to deflect horizontally at a display stage; and forming an insulating layer, a liquid crystal layer, the first substrate and a first polarizer sequentially on the touch sensing electrodes and the liquid crystal driving electrodes, wherein the method further comprises:

forming a pattern of an electrode layer on a third substrate or a fourth substrate, the electrode layer being configured to receive a touch driving signal at a touch stage so as to detect a touch operation, and receive a first common electrode signal at the display stage so as to display an image.

15. The method according to claim 14, wherein when forming the patterns of the touch sensing electrodes and the liquid crystal driving electrodes arranged alternately at an identical layer and insulated from each other on the second substrate by a single patterning process, the method further comprises:

forming dummy electrodes arranged at an identical layer to, and insulated from, the touch sensing electrodes and the liquid crystal driving electrodes, each dummy electrode being arranged between two adjacent touch sensing electrodes.

16. The method according to claim 14, wherein the touch sensing electrodes and the liquid crystal driving electrodes are all strip-like electrodes, and the electrode layer is of a strip-like pattern.

17. The method according to claim 14, wherein each touch sensing electrode is formed by binding a plurality of slit strip-like electrodes.

18. A method for driving the three-dimensional (3D) touch display device according to claim 1, comprising steps of:

at a display stage within a time period, sending a liquid crystal driving signal including a pixel electrode signal and a common electrode signal to a liquid crystal driving electrode so as to drive liquid crystals above the liquid crystal driving electrode to deflect horizontally by a predetermined angle, and sending a first common electrode signal to an electrode layer; and at a touch stage within the time period, sending a driving touch signal to the electrode layer.

19. The method according to claim 18, wherein the time period is the time desired for displaying one frame.

20. The method according to claim 18, wherein at the display stage, the touch sensing electrode is at a potential of 0V identical to a common electrode of the 3D grating cell; and at the touch stage, a pixel electrode of the 3D grating cell is at a potential of 0V identical to the common electrode of the 3D grating cell.

* * * * *